United States Patent [19] [11] 4,319,999
Gruesbeck [45] Mar. 16, 1982

[54] GRANULAR MATERIAL TRAP

[75] Inventor: Thomas L. Gruesbeck, Maumee, Ohio

[73] Assignee: Libbey-Owens-Ford Company, Toledo, Ohio

[21] Appl. No.: 82,744

[22] Filed: Oct. 9, 1979

[51] Int. Cl.³ .............................................. B01D 23/10
[52] U.S. Cl. ...................................... 210/95; 210/266; 210/287; 210/293
[58] Field of Search ................. 210/95, 307, 454, 287, 210/289, 291, 263, 266, 446, 459, 460, 293

[56] References Cited
U.S. PATENT DOCUMENTS
3,004,668 10/1961 Adams ................................ 210/293
3,634,229 1/1972 Stanley, Jr. ........................... 210/95
3,923,657 12/1975 Rosen .................................... 210/95
3,957,647 5/1976 Jones .................................. 210/307

FOREIGN PATENT DOCUMENTS
253458 6/1926 United Kingdom .................. 210/95
363173 12/1931 United Kingdom .................. 210/95

Primary Examiner—Ernest G. Therkorn
Attorney, Agent, or Firm—Collins, Oberlin & Darr

[57] ABSTRACT

A water demineralization system including tanks for containing granular materials adapted to remove the minerals from the water. A trap is tapped into the outlet pipe of each tank for preventing the loss or escape of the granular material in the event of leakage out of such tanks.

2 Claims, 5 Drawing Figures

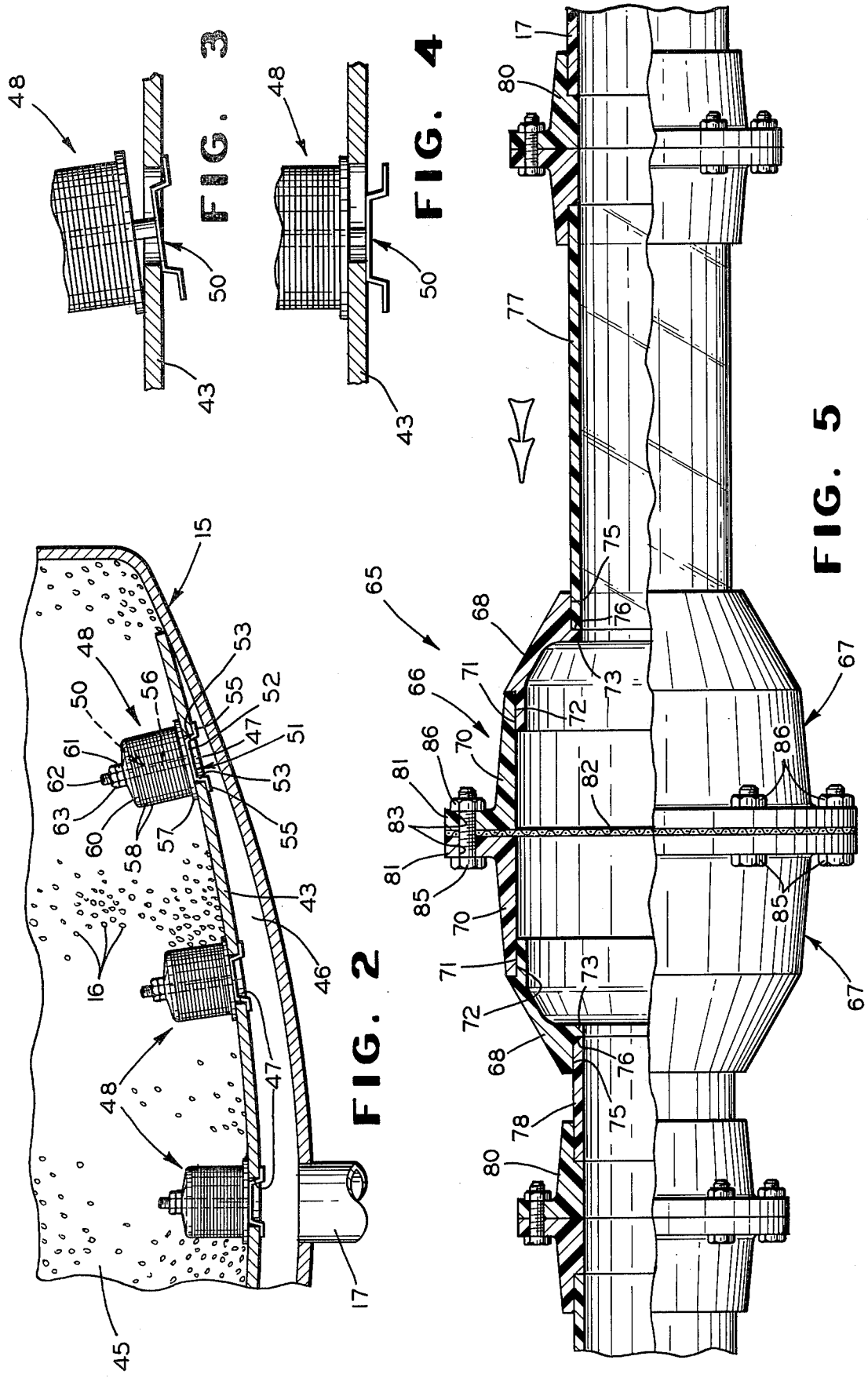

GRANULAR MATERIAL TRAP

BACKGROUND OF THE INVENTION

This invention relates generally to a water treating process and, more particularly, to apparatus for precluding the loss of granular synthetic resin material employed in a water demineralization process.

In the basic glass making furnaces and other high temperature glass fabricating operations, water is conveniently utilized as the coolant in the closed recirculating cooling systems therefor. However, it has been found that ordinary city or tap water possesses certain disadvantages when so employed. For example, the dissolved minerals and other constituents present in ordinary tap water tend to precipitate out of solution, particularly at the elevated temperatures encountered, and form deposits along the walls of the furnace cooling passages. Such deposits not only insulate the furnace walls to interfere with the proper heat transfer therethrough, but also vary in thicknesses along such walls to create "hot spots" therealong. Accordingly, it is important to first demineralize ordinary tap water before introducing the same into the various furnace cooling systems.

To this end, synthetic resin ion-exchangers have been developed to remove both cations (positive ions) and anions (negative ions) from water to completely demineralize the same. This is accomplished by passing the untreated water first through a resin exchanger which replaces all metal ions with hydrogen ions, then through a resin which removes the resulting acids. For optimum results, the resins are contained in vessels and are in granular or particulate form to provide the largest surface areas possible. Problems have been encountered by leakage of such resins from their respective containers or vessels. Not only is the replacement cost of such lost resins expensive, but they tend to migrate through the system, uncontrollably contaminating the same.

SUMMARY OF THE INVENTION

Accordingly, it is a primary object of the present invention to provide an apparatus for preventing the loss or escape of granular material from their respective containers.

It is another object of the present invention to provide a filter trap downstream of a resin container for catching or trapping any granular resin material that might escape out of such containers.

The foregoing and other objects, advantages and characterizing features of the present invention will become clearly apparent from the ensuing detailed description thereof, considered in conjunction with the accompanying drawings, wherein like reference numerals denote like parts throughout the various views.

BRIEF DESCRIPTION OF THE DRAWINGS

FIG. 2 is a fragmentary, sectional view of a tank containing a granular, synthetic resin ion-exchanger employed in the foregoing water demineralization system;

FIGS. 3 and 4 are side elevational views, showing the improper installation of strainer assemblies mounted in openings adjacent the bottom of a granular resin containing tank; and FIG. 5 is a side elevational view, partly in section, and on an enlarged scale, showing the resin trap constructed in accordance with this invention.

DESCRIPTION OF THE PREFERRED EMBODIMENT

Figure 1:
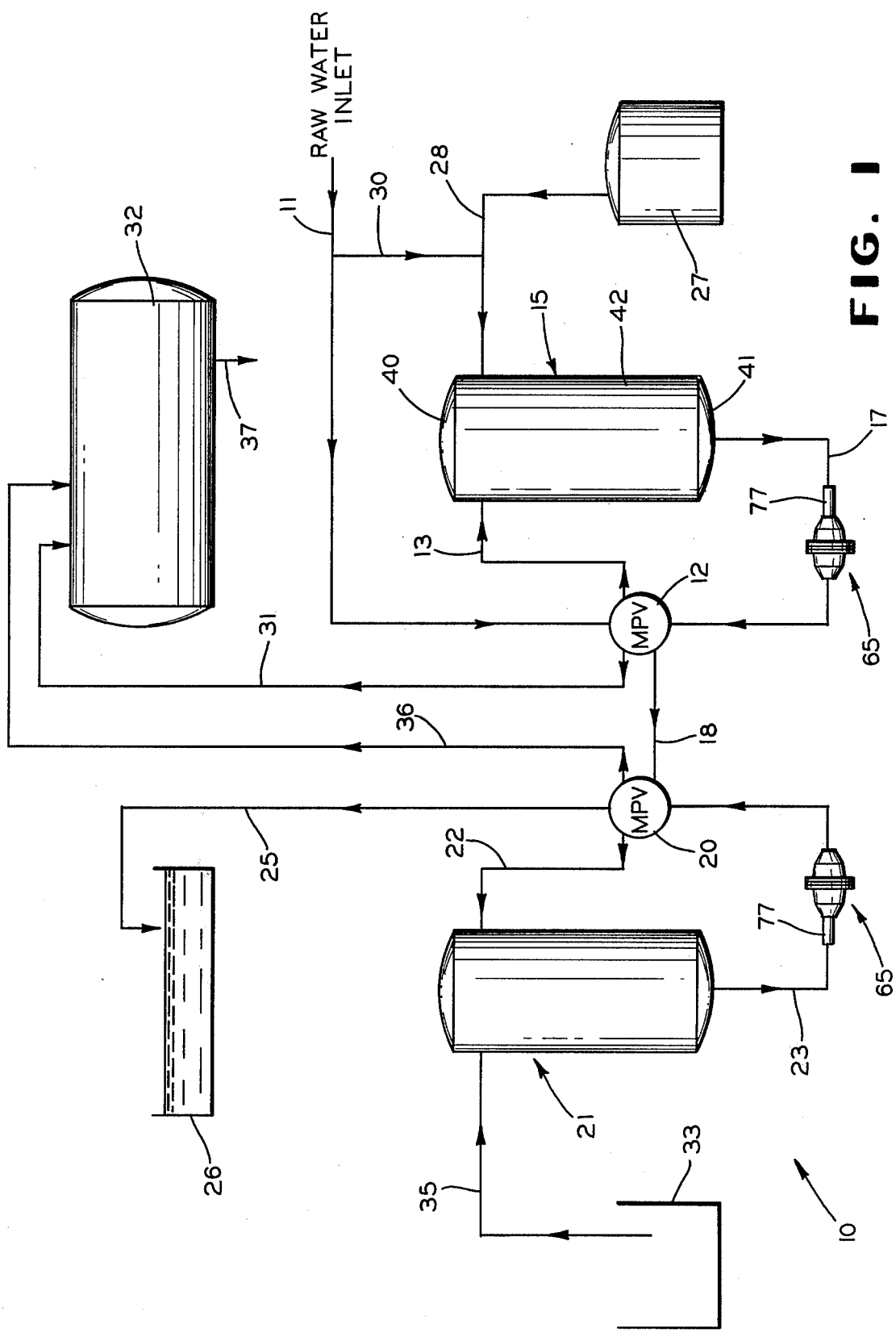
FIG. 1 is a schematic or diagrammatic view of a water demineralization system.

Referring now in detail to the illustrative embodiment depicted in the accompanying drawings, there is shown in FIG. 1 a diagrammatic illustration of a water demineralization system, comprehensively designated 10, embodying certain novel features of this invention, which will hereinafter be fully described in detail. The resulting demineralized water processed through the system 10 is intended for use as a coolant for high temperature furnaces and the like employed in the glass making and fabricating art. However, it should be understood that system 10 is in no way restricted to such usage, but has utility in a wide variety of applications wherein it is desirable to utilize demineralized or otherwise treated water.

The water treating system 10 includes a main supply line 11 connected at its upstream end to a suitable source of tap or raw water under pressure (not shown), supply line 11 being of sufficient size to convey all of the water required for the system at the desired pressure. Main supply line 11 is connected to a multiple port control valve 12 for directing the untreated water via conduit 13 into the upper end of a vessel or tank 15, which is substantially filled with a granular synthetic resin material 16 (FIG. 2). While not limited thereto, preferably the synthetic resin material is a sulfonated polystyrene polymer in coarse, particulate or granular form and which contains a very large number of hydrogen ions. As is well known, the ions of the dissolved mineral constituents existing in the untreated water displace the hydrogen ions as the water percolates downwardly through the thick bed of synthetic resin material 16. Thus, the water effluent leaving tank 15 via conduit 17 is essentially free of cations. However, the additional hydrogen ions displaced from the synthetic resin material form acids with the non-metallic ions (anions) which are a part of the partially treated water.

The conduit 17 is connected to multiple port control valve 12, which in turn, reroutes the water effluent via conduit 18 to a second multiple port control valve 20. Valve 20 is ported to connect conduit 18 to the upper end of a second vessel or tank 21 by means of conduit 22. Tank 21 is substantially filled with a granular, synthetic resin material, such as that available under the trademark "Amberlite" for example, or any other suitable resin material which contains a very large number of carbonate ions. The partially treated water containing acids percolates downwardly through the bed of synthetic resin material, replacing the carbonate ions with the ions of the acids in such water. Thus, the effluent water leaving tank 21 via conduit 23 is completely demineralized. This demineralized effluent is directed by multiple port control valve 20 to a discharge line 25 leading to a reservoir 26. The reservoir 26 supplies any make-up demineralized water required for the water cooling system of any high temperature operation desired.

When the effective capacity of the cation and anion exchangers have been reached, i.e. when most of the hydrogen ions have been occupied by the metal ions in tank 15 and the carbonate ions replaced by the acid ions in tank 21, the ion exchangers must be regenerated to restore them to their original conditions. In the case of the cation exchanger, a concentrated acid containing a great number of hydrogen ions, such as hydrogen chloride for example, stored in a container 27, is introduced into the upper end of tank 15. The acid is conveyed by conduit 28 and mixed with the tap water delivered by branch line 30 connected to main supply line 11. This mixture filters downwardly through the thick bed of granular synthetic resin material, causing the hydrogen ions to displace the metal ions from the cation exchanger thereby reconditioning or regenerating the cation exchanger to its original condition for further use in demineralizing the raw tap water. The effluent leaving tank 15 via conduit 17 is ported by control valve 12 to a line 31 conveying the waste effluent to a neutralizer 32. It should be appreciated that the various control valves (not shown) necessary to effect regeneration, as well as shifting of multiple port control valve 12 in a proper timed relation to close conduit 13 and connect conduit 17 to the proper line, can be effected manually or automatically in a conventional way. Accordingly, no further amplification or detailed description of such valving and the timing arrangement therefor is believed necessary.

Regeneration of the anion exchanger in tank 21 is effected by introducing soda ash (sodium carbonate) from a suitable storage container 33 into the upper end of tank 21 by way of a conduit 35. As the sodium carbonate solution, which contains a great number of carbonate ions, filters downwardly through the bed of granular synthetic resin material, the ions of the acids now existing therein are replaced by the carbonate ions to regenerate the anion exchanger to its original condition for further use. The acidic waste effluent leaving tank 21 via conduit 23 is now directed by multiple port control valve 20 to a discharge line 36 leading to the neutralizer 32. As is well known, the neutralizer 32 is operative to neutralize the waste effluents from tanks 15 and 21 to yield an effluent free of any constituents which might harmfully contaminate or pollute the surrounding soil or water and which meets contemporary government standards governing the disposition of waste effluents. Such effluents can be safely discharged, as by line 37, into the environment without the hazard of pollution.

Since the tanks 15 and 21 are of similar design, only the tank 15 will be described in detail, it being understood that the other tank is of similar construction and purpose and the same reference characters denote identical parts. As best shown in FIG. 1, tank 15 is oriented vertically and has a generally cylindrical configuration with a top wall 40, a bottom wall 41 and a cylindrical side wall 42. The tank 15 is provided with an annular, slightly bowed strainer plate 43 (FIG. 2) connected along its peripheral edge, as by welding, to the tank bottom wall 41 adjacent the outer edge thereof. The strainer plate 43 is spaced above bottom wall 41 and serves as a partition, separating the interior of tank 15 into a main chamber 45 containing the granular synthetic resin material 16 and a lower chamber 46 which receives the treated effluent and discharges the same into conduit 17. Strainer plate 43 is formed with a plurality of openings 47 to permit passage of the effluent from the main chamber 45 into lower chamber 46.

In order to preclude escape of the granular resin material, each opening 47 in plate 43 is covered by a strainer assembly, generally designated 48. Each strainer assembly 48 comprises a T-shaped bar 50 having a base member 51 comprised of a straight body portion 52 substantially in the same plane as the upper surface of strainer plate 43 and having opposite end angularly bent portions 53 that extend downwardly away from body portion 52 into the opening 47. These bent portions 53 terminate in flanges 55 substantially parallel to body portion 52 and extend beneath the lower surface of the plate 43. The intersections of the angularly bent portions 53 with flanges 55 define shoulders engageable with the lower edge defining the opening 47. An upright stud 56 is welded or otherwise fixedly secured to base member 51 centrally thereof and extends upwardly into the main chamber 45.

An enlarged washer 57 is disposed about stud 56 and engages the upper surface of strainer plate 53. This washer 57 overlies the opening 47 and supports a series of stacked screen discs 58 which prevent the escape of the granular resin material through opening 47. A cover or cap 60 surmounts the disc assembly and is lightly pressed thereagainst by means of a nut 61 threaded onto the threaded portion 62 of stud 56 to secure the disc assembly together. A lock nut 63 bears against nut 61 to prevent the latter from slacking back.

While the above-described strainer assemblies 48 generally serve the purpose for which they are intended, they are not entirely satisfactory. For example, in the event such assemblies are incorrectly installed, such as shown in FIG. 3 wherein the assembly is slightly cocked relative to the strainer plate 43 or, as depicted in FIG. 4, the shoulders of the T-bar base member 51 are not properly seated beneath plate 43, leakage of the granular resin material therepast can occur. Also, the acids and other deliterious constituents present in the water being treated can deteriorate the materials of the strainer assemblies 48, causing resin escape therethrough. Not only does such resin leakage contaminate the treated water, but the expensive replacement costs of the resin material, as well as the apparatus "down time" to effect such replacement, drastically increases maintenance costs.

The present invention obviates these shortcomings by providing resin traps, generally designated 65, in conduits 17 and 23, respectively, to prevent the loss or escape of granular resin material from the tanks 15 and 21 upon failure of one or more strainer assemblies 48 therein. Each trap 65 comprises a hollow, composite, two-piece body 66 including a pair of opposed coupling sections 67 of identical construction, each formed of a bushing element 68 and a flange element 70 having overlapping portions 71 and 72, respectively, at their adjacent ends cemented or otherwise fixedly secured together. The body 66 is formed of a plastic, non-corrosive material, preferably polyvinyl chloride for example. However, the trap body 66 can be formed of any suitable material having similar properties of durability, resistance to corrosion, and which is capable of withstanding oxidation and deliterious chemicals without consequent deterioration.

The bushing element 68 is provided with an annular rib 73 extending radially into the bore thereof and an annular wall portion 75 extending from the outer end of element 68 inwardly to the leading face 76 of rib 73 to define a socket therein for receiving the end portion of a suitable pipe section. In the illustrative embodiment of FIG. 5, the socket end of the trap nearer to its associated tank, i.e. the inlet end, receives a pipe section of clear, transparent plastic material which serves as a sight gauge 77 for a purpose hereinafter explained. The other socket end of the trap receives a pipe section 78 of opaque plastic material. The ends of the pipe sections 77 and 78 inserted in the socket ends can be rigidly secured therein as by a shrink fit, by a suitable adhesive, or by any other suitable means. The other ends of pipe sections 77 and 78 are connected to the piping system of the water demineralization process by suitable coupling members 80.

The flange elements 70 of sections 67 are provided with annular flanges 81 adapted to clamp a plastic, 40-mesh screen 82 therebetween. The screen 82 preferably is formed of polyester with each opening being about 0.017 inch for a total open area of approximately 46%. The flanges 81 are formed with aligned openings 83 for receiving bolts 85 therethrough which are tightened by nuts 86 to urge the flanges 81 together.

In operation, the effluent leaving tanks 15 and 21 is conveyed from the lower chambers 46 therein through conduits 17 and 23 and passes freely through the traps 65. In the event the granular resin material should leak past any one or more of the several strainer assemblies 48 in tanks 15 and 21, the traps 65 become operative to strain the resulting effluent by means of screen 82 and filter out the resin material. Back-up of the resin material into sight gauge 77 alerts the attendant of resin leakage so that corrective measures can be taken before there is any significant loss of such resin. Thus, the resin traps 65 of the present invention serve as back-up strainers, precluding any significant loss of the granular resin material from tanks 15 and 21 and insuring against the uncontrolled flow of such material into the water demineralization system, thereby avoiding contamination of the same.

It should be understood that the trap 65 of this invention is not limited in use with a water demineralization process, nor even an ion-exchange process, but has utility in any application wherein it is desired to provide a back-up strainer arrangement to prevent loss of control over granular or particulate material in the event of leakage of such material from their respective containers.

It is to be understood that the form of the invention herein shown and described is to be taken as an illustrative embodiment only of the same, and that various changes in the shape, size and arrangement of parts, may be resorted to without departing from the spirit of the invention.

I claim:

1. A liquid treating apparatus comprising: a tank containing a bed of granular material, means for supplying a liquid under pressure to said tank in which said liquid percolates through said granular bed, an outlet conduit connected to said tank adjacent the bottom thereof for conveying the liquid effluent therefrom, means for controlling the flow of said liquid into and out of said tank, strainer means within said tank normally retaining said granular material within said tank while permitting passage of said liquid effluent therethrough, means tapped into said outlet conduit downstream of said strainer means and said tank for trapping any granular material leaking past said strainer means and out of said tank, said trapping means including a hollow body comprised of opposed sections, angular flanges formed on said sections at the adjacent edges thereof, a screen interposed between said flanges, means urging said flanges toward each other to clamp said screen therebetween, a transparent pipe section connected at one end to said hollow body at the inlet end thereof to visually indicate the accumulation of any granular material filtered out by said screen.

2. Apparatus according to claim 1, wherein said screen is formed of a 40-mesh polyester material.

* * * * *